(12) United States Patent
Taussig

(10) Patent No.: US 7,002,895 B1
(45) Date of Patent: Feb. 21, 2006

(54) OPTICAL DISK HAVING ZONE CONSTANT ANGULAR VELOCITY WOBBLE

(75) Inventor: Carl P. Taussig, Woodside, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 986 days.

(21) Appl. No.: 09/716,198

(22) Filed: Nov. 18, 2000

(51) Int. Cl.
    *G11B 7/24* (2006.01)
(52) U.S. Cl. .................. 369/275.1; 369/275.3
(58) Field of Classification Search ........... 369/275.1, 369/275.3
    See application file for complete search history.

(56) References Cited

U.S. PATENT DOCUMENTS

| | | | |
|---|---|---|---|
| 5,163,035 A * | 11/1992 | Hirokiri | 369/44.13 X |
| 5,936,933 A * | 8/1999 | Miyamoto et al. | 369/275.3 |
| 5,991,257 A | 11/1999 | Kobayashi et al. | |
| 5,999,504 A * | 12/1999 | Aoki | 369/44.13 X |
| 6,028,828 A * | 2/2000 | Maeda | 369/50 |
| 6,067,281 A * | 5/2000 | Kobayashi et al. | 369/47 |
| 6,256,282 B1 * | 7/2001 | Yamagami et al. | 369/111 |
| 6,334,021 B1 * | 12/2001 | Nagasawa | 386/45 |
| 6,345,018 B1 * | 2/2002 | Maegawa et al. | 369/44.13 |

FOREIGN PATENT DOCUMENTS

| | | |
|---|---|---|
| EP | 0827139 | 3/1998 |
| EP | 0920007 | 11/1998 |
| EP | 0939398 | 2/1999 |

\* cited by examiner

*Primary Examiner*—Aristotelis M. Psitos

(57) ABSTRACT

An optical disk has a groove in a recordable medium. The groove has a constant angular velocity wobble that is BPSK-modulated. Such a wobble provides timing and address information.

24 Claims, 2 Drawing Sheets

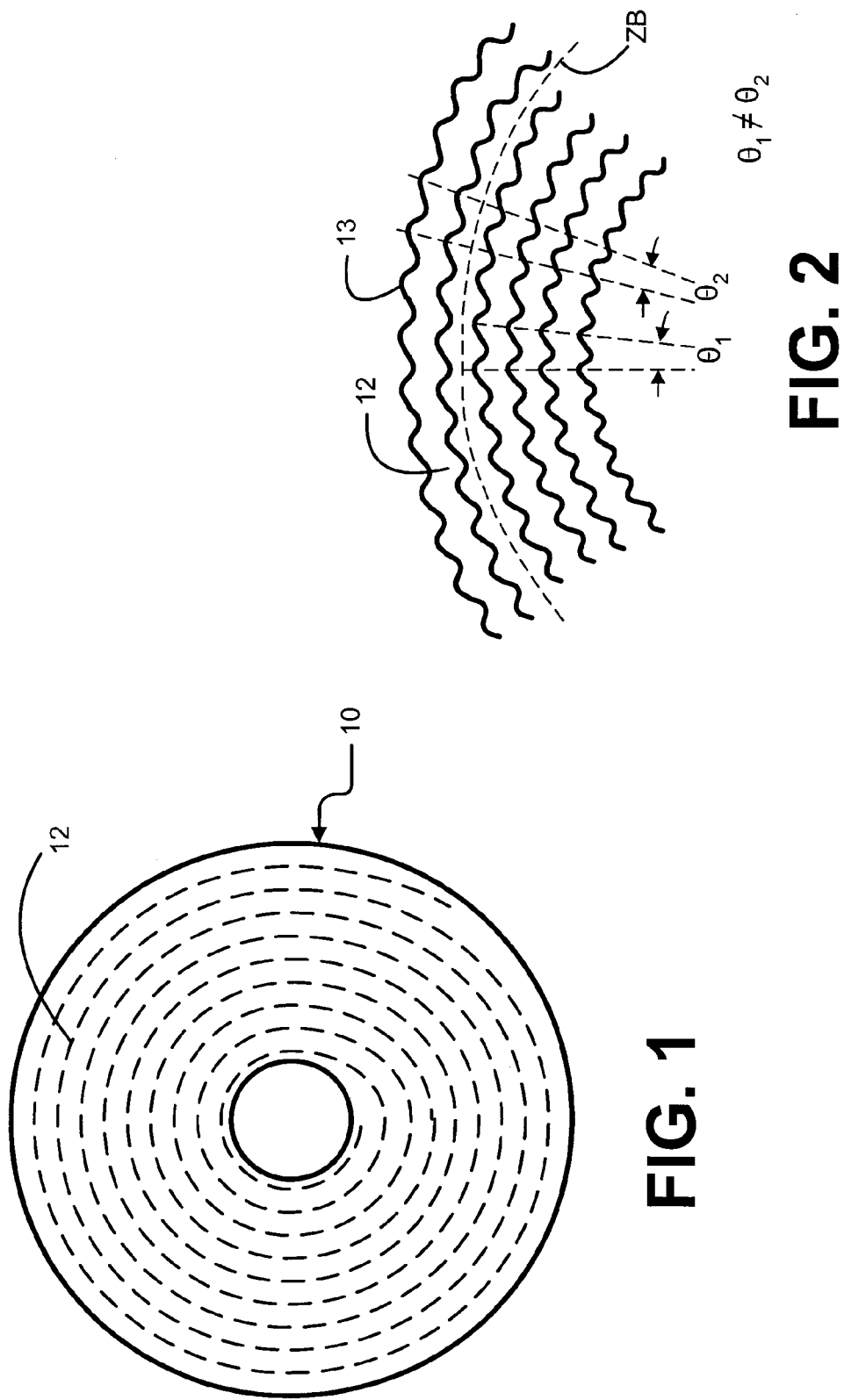

US 7,002,895 B1

OPTICAL DISK HAVING ZONE CONSTANT ANGULAR VELOCITY WOBBLE

BACKGROUND OF THE INVENTION

The invention relates to optical data storage. More specifically, the invention relates to an optical disk having timing and address information embossed in a wobbled groove.

"Read/write" optical disks include optical disks that allow data to be written only once and optical disks that allow data to be written many times. A DVD+RW disk is a type of read/write disk that allows data to be written many times.

When writing data to a read/write disk, it is desirable not to create a frequency or phase discontinuity between the data being written ("new" data) and data previously written ("old" data). A read/write drive might not be able to tolerate such discontinuities during readback of the old data and the new data. During readback, the discontinuities can cause problems for read clocks and data recovery circuitry. Consequently, the discontinuities can render portions of the read/write disk effectively unreadable by the read/write drive.

Certain types of drives overcome this problem by the use of "edit gaps" (also known as "splice areas" and "buffer zones"). Edit gaps are spaces that separate data blocks. An edit gap provides a margin of error so that old data is not overwritten by new adjacent data. However, the use of edit gaps has its drawbacks. Storage capacity of the read/write disk is reduced because data is not stored in the edit gaps.

Other types of drives overcome the phase/frequency discontinuity problem by performing bit-accurate or linkless editing, whereby new blocks of data are written with negligible frequency or phase discontinuity with respect to adjacent blocks of old data. This bit-accurate editing is accomplished by exploiting accurate timing information embossed in a high frequency wobbled groove in the read/write disk. The bit-accurate editing eliminates the need for edit gaps.

When writing new data to a read/write disk, a bit-accurate read/write drive modulates the wobbled shape of the groove to generate a raw wobble signal. A wobble clock may be generated by a phase locked loop (PLL) that is locked to a harmonic of the raw wobble signal. The wobble clock provides an extremely accurate time reference, which is insensitive to misalignments. Edges of data marks can be aligned with edges of the wobble clock with a high degree of accuracy.

SUMMARY OF THE INVENTION

According to one aspect of the invention, an optical disk has a groove in a recordable medium. The groove has a constant angular velocity wobble. Such a wobble reduces jitter during playback of the disk.

Other aspects and advantages of the invention will become apparent from the following detailed description, taken in conjunction with the accompanying drawings, illustrating by way of example the principles of the invention.

BRIEF DESCRIPTION OF THE DRAWINGS

FIG. 1 is an illustration of a DVD disk;

FIG. 2 is an illustration of a plurality of wobble cycles in multiple zones of the disk.

DETAILED DESCRIPTION OF THE INVENTION

Figure 3:
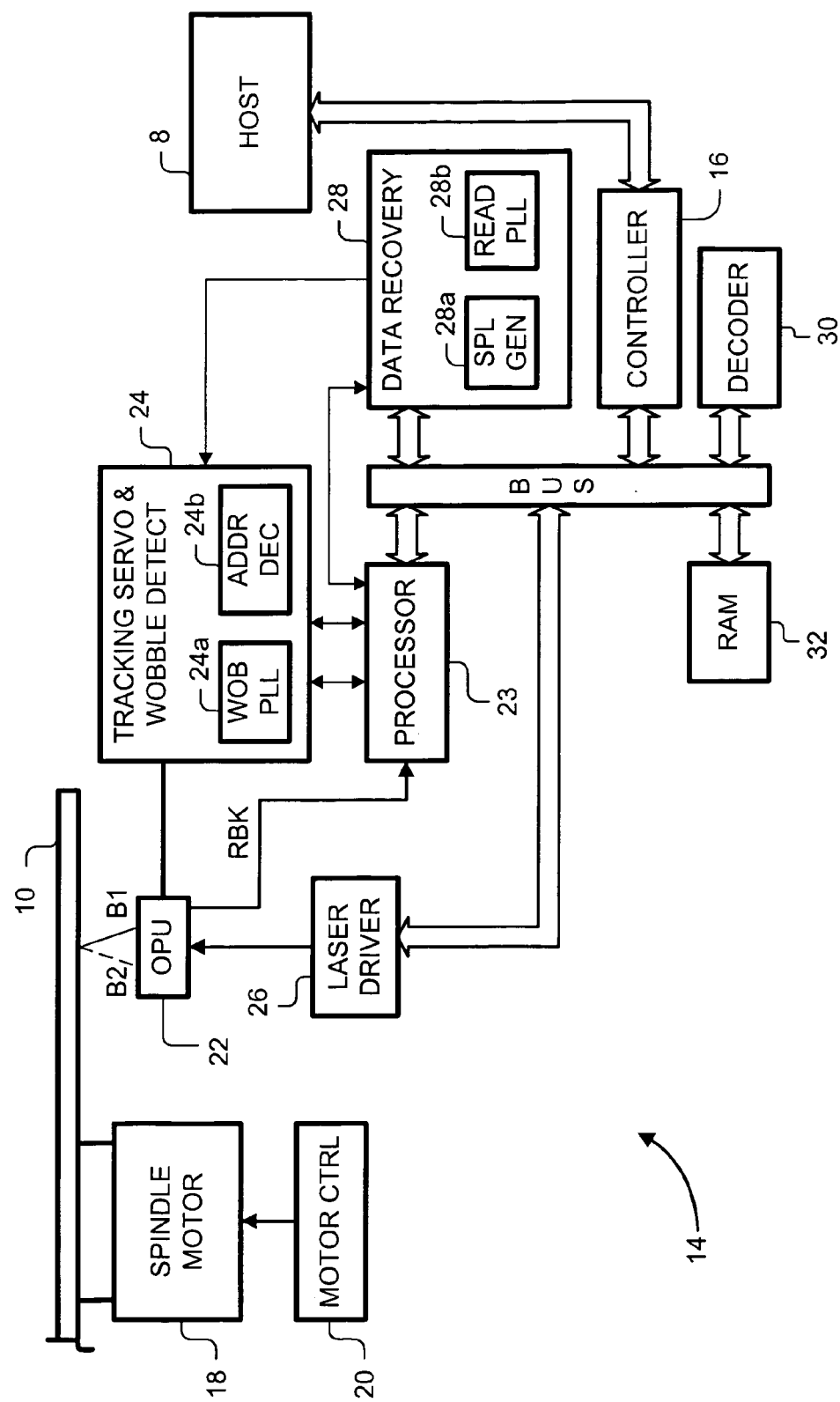
FIG. 3 is an illustration of a bit-accurate drive for exploiting the information conveyed by the wobble cycles.

As shown in the drawings for purposes of illustration, the invention is described in connection with an optical disk for a bit-accurate read/write drive. The optical disk includes a recordable medium and a wobbled groove in the medium. The bit-accurate drive can generate a highly accurate timing signal from the wobbled groove. Wobble of the groove is BPSK-modulated to encode address information. Period and spatial relation of wobble cycles of the groove are selected to reduce jitter during readback of data stored on the disk. Reducing the jitter increases the signal-to-noise ratio, which, in turn, lessens the burden on error code correction. Resulting is a greater capability to handle other disturbances (e.g., mechanical disturbances, disturbances due to media defects) to the readback channel.

Referring to FIG. 1, a phase-change optical disk 10 includes a rigid substrate that is coated with a recordable medium. The recordable medium may be made of a read/write material such as a phase change material. A spiral groove 12 is embedded in the disk 10. A laser beam may be used to heat and cool the recordable medium quickly to form marks having an amorphous state. The laser beam may also be used to erase the marks from the recordable medium by annealing the marks into a crystalline state. Data is represented by patterns of marks on the disk 10.

The spiral groove 12 has a high frequency wobble for providing timing information. The groove 12 meanders (wobbles) sinusoidally about its centerline. Low frequency address information is imposed on the wobble by Bi-Phase Shift Keying (BPSK) modulation of the wobble. The phase of each group of consecutive cycles of the wobble is either normal or shifted (e.g., shifted by 180 degrees). Address information is conveyed by varying the phase between normal and shifted. The combination of the high frequency timing signal and the address information allows a bit-accurate drive to determine addresses of data blocks being read from the disk 10. The groove 12 has a constant track pitch.

The wobble of the groove 12 is a constant angular velocity (CAV) wobble. Such a wobble reduces jitter during playback of the disk 10.

Reference is now made to FIG. 2, which shows a plurality of wobble cycles 13 of the groove. The wobble cycles 13 form a plurality of concentric zones, with each zone including at least one track of wobble cycles 13. A zone boundary is indicated by the dashed line (ZB). A typical DVD disk might have 500 zones.

Each wobble cycle 13 is represented by a full sine wave. All wobble cycles 13 in the same zone subtend the same angle ($\theta_1, \theta_2, \ldots, \theta_n$). Although wobble cycles 13 in the same zone subtend the same angle, wobble cycles 13 in different zones subtend different angles (e.g., $\theta_1 \neq \theta_2 \neq \theta_n$). For example, $\theta_1 > \theta_2 > \theta_n$ if $\theta_1$ is at the inner diameter and $\theta_n$ is at the outer diameter. The wobble cycles 13 are spatially coherent.

The wobble angle (e.g., $\theta_1$) of a zone is chosen such that the average spatial period of a wobble cycle 13 in that zone is an integer multiple of the channel bit length. Maximum deviation of the spatial period in a zone is a percentage (e.g., ±1%) of the average spatial period of that zone. In the aggregate, a zone of a disk having a CAV wobbled groove has the same number wobble cycles (to first order) as a zone of a disk having a constant linear velocity (CLV) wobbled groove. This is done for compatibility with existing ROM players.

Moreover, the average wobble spatial period is constant across the entire disk 10. Thus, a groove having CAV wobble has the same number of wobble cycles as a groove having CLV wobble. This too is done for compatibility reasons with existing ROM players.

For example, a bit-accurate drive following the DVD-ROM specification has a standard channel bit length of 0.133 micrometers. A DVD-ROM disk for the drive has n=500 zones. The wobble angles ($\theta_1, \theta_2, \ldots, \theta_n$) are selected such that the average spatial period of the wobble cycles 13 in each zone is p(0.133) micrometers and the average spatial period across the entire disk is p(0.133) micrometers, where $8 \leq p \leq 32$. For p=32, maximum deviation of the spatial period in a zone is ±1% of 4.256 micrometers. The maximum difference in wobble spatial period between any two zones is ±2%. Such a disc has the same number of wobbles cycles as a DVD-ROM disk having CLV wobble.

The wobble is called a constant angular velocity wobble because of the way the disk 10 is mastered. During disk mastering, a smooth glass disk is coated with photoresist and rotated on a precision spindle under servo control. The spindle is rotated at a constant angular velocity. The photoresist is exposed to a focused laser beam, which is continuously translated to form a spiral groove. The wobble of the groove may be formed by deflecting the laser beam with an electro-optical modulator while exposing the photoresist. The groove may be BPSK-modulated by modulating the power of the laser beam while exposing the photoresist. Thus wobble cycles that are 180 degrees out-of-phase may be formed.

After the groove has been formed, the disk is developed to remove exposed photoresist and harden unexposed photoresist. The resulting groove is filled with a metal (usually nickel). The metal plating is separated from the disk and mounted to a metal backing plate to form a sub-master or stamper.

The sub-master is used to stamp BPSK-modulated wobbled grooves in polycarbonate plastic substrates. After the substrates are stamped, they may be coated with a recordable medium. The recordable medium is then coated with a protective lacquer film. Laser light used for reading and writing data is focused through the substrate.

FIGS. 1 and 2 merely provide illustrations for facilitating an understanding of the disk 10. Aside from illustrating spatial coherence of the wobble cycles, these figures do not show the disk 10 in proper scale. For instance, pitch of the spiral, the thickness of the groove 12, the frequency of the wobble, etc., are not illustrated to scale.

Reference is now made to FIG. 3, which shows a bit-accurate read/write drive 14. The drive 14 includes a controller 16, a spindle motor 18 and a motor control 20 for rotating the disk 10. The drive 14 further includes an optical pickup unit 22, which typically includes a laser for generating a laser beam B1; and means (e.g., an optics assembly and photodetector array) for detecting a modulated beam B2. The optical pickup unit 22 may further include a radial push-pull sensor having a detector that is divided into four quadrants. Each quadrant produces an output signal that is substantially proportional to optical power incident on that quadrant. The signals from the four quadrants may be combined to generate a readback signal (RBK), which carries data and timing/address information.

A laser driver 26 drives the laser of the optical pickup unit 22. A processor 23 receives the readback signal from the optical pickup unit 22.

A tracking servo and wobble detection system 24 receives the readback signal RBK from the processor 23. The tracking servo and wobble detection system 24 processes the readback signal to obtain address information and generate a precise high frequency timing signal. Under command of the controller 16, the tracking servo and wobble detection system 24 also moves the optical pickup unit 22 along the disk 10. The tracking servo and wobble detection system 24 includes a wobble detector 24a and a wobble address decoder 24b. The wobble detector 24a includes a high frequency clock wobble PLL for generating wobble data and a wobble clock. The wobble PLL may use a decision-directed algorithm such as a Costas loop to generate the wobble clock, which is locked to a harmonic of the raw wobble signal. The wobble address decoder 24b decodes the wobble clock and wobble data into addresses. Generation of the wobble clock is disclosed in assignee's U.S. Pat. No. 6,046,968, the specification of which is incorporated herein by reference.

A data recovery circuit 28 also receives the readback signal from the processor 23 and recovers data from the readback signal (RBK). The data recovery circuit 28 includes a slice generator 28a that captures slices of the readback signal (RBK) and a read clock generator 28b for locking a clean clock to the output of the slice generator 28a. The read clock generator 28b may include a read PLL. An output of the read clock generator 28b provides a read clock.

A decoder 30 demodulates the data recovered from the data recovery circuit 28 (for example, the recovered data is converted from 16-bit symbols to 8-bit data words), arranges the demodulated data in error correction code (ECC) blocks in RAM 32, and performs error correction on the ECC blocks. The error-corrected data is sent to a host 8. In the alternative, the demodulated data may be sent directly to the host 8, which performs the error correction.

During write operations, the wobble groove is detected by the radial push-pull sensor, which provides an tracking error signal to the tracking servo. The tracking error signal keeps the detector centered over the track being detected (the "center" track).

The raw wobble signal is influenced not only by the track upon which the laser beam is focused, but also by radially adjacent tracks. The resulting phase modulation has a beat frequency equal to ($2\pi\, t_p/W$), where W is the spatial period of a wobble cycle and $t_p$ is the track pitch. The wobble clock is then used to synchronize to the data on the disk.

A bit-accurate DVD drive, for example, writes modulation-encoded RS-PC blocks to the disk 10. When the block is written to the disk 10, lines or rows are usually laid down successively in the spiral groove 12. The lines or rows usually begin at the center of the disk 10. Marks representing the data are spatially aligned with the wobble clock with a high degree of accuracy. Thus the data period is held to within ±1% of the standard channel bit length.

The read and wobble PLLs have different characteristics. Typically the wobble PLL has a low bandwidth characteristic for rejecting noise resulting from eccentricity of the tracks with respect to the center of rotation. The read PLL, in contrast, has a high bandwidth characteristic in order to improve access performance. (A data signal produced by pre-existing marks on the disk is an unwanted source of noise if the data signal appears with the wobble clock but the read signal is detected though the central aperture and is not detected in the radial push-pull sensor.)

If a CLV wobbled groove was BPSK-modulated, radially adjacent tracks would create a phase disturbance with the track being sensed. The frequency of this phase disturbance would depend upon the address data and the address bit length. The effect of the wobble phase modulation on the quality of the playback data would be determined by the characteristics of the read and wobble PLLs. (The disturbance would come from the superposition of the signals from the center and adjacent tracks. Although phase and amplitude are modulated, only the phase modulation matters. The write clock mostly tracks the disturbance and writes the disturbance into the data. The read clock mostly follows the written-in disturbance, but not completely. Therefore, a phase error or "jitter" results.)

However, because the CAV wobble cycles are spatially coherent, the CAV wobble eliminates the phase disturbance from neighboring tracks (amplitude disturbance remains). In the case of adjacent tracks lying in the same zone, the amount of interference is negligible. In the case of adjacent tracks lying in different zones, the amount of interference is limited to the difference between the wobble periods of the tracks in the different zones (e.g., a 2% difference). However, the wobble PLL bandwidth may be increased to track the resulting disturbance with less error. In the alternative, the transition between zones may be made smooth instead of abrupt. The smooth transition would minimize the disturbance to the wobble PLL.

Thus disclosed is a disk format that reduces the jitter in disks having a BPSK-modulated wobble. Reducing the jitter substantially increases the signal-to-noise ratio of the user data, except at the zone boundaries. The signal-to-noise ratio of the user data is increased because of the lack of phase modulation caused by address information on adjacent tracks (the jitter results because some of the phase modulation is impressed on the written data once the phase disturbance is partially followed by the wobble PLL and not completed tracked by the read PLL). The signal-to-noise ratio of the address information is increased because the length and frequency of the BPSK symbols are increased.

Substantially increasing the signal-to-noise ratio of the address information, in turn, allows the use of inexpensive detection circuitry; or the ability to encode more information in the address data (e.g., disk manufacturing data, laser power parameters for optimal writes, disk key information for copy protection, higher repeat rate of address information for shorter latency during random write operations); or lessens the burden on error code correction. Lessening the burden on error code correction allows the bit-accurate drive to handle other disturbances to its readback channel.

The disk 10 allows the characteristics of the wobble PLL to be modified. The wobble PLL can have a higher bandwidth than a CLV wobble PLL since the address information does not disturb the wobble PLL.

Although FIG. 2 shows wobble cycles that are spatially coherent, the disk format is not so limited. Phase disturbance can be eliminated if the wobble cycles are completely out-of-phase.

Address information may be encoded in the wobble by means other than BSPK modulation. For example, the address information may be encoded by on-off keying (a.k.a. missing wobbles).

The invention is not limited to the specific embodiment described and illustrated above. Instead, the invention is construed according to the claims that follow.

What is claimed is:

1. An optical storage medium comprising:
   a recordable medium; and
   a groove in the recordable medium, the groove having a constant angular velocity wobble, wherein wobble cycles of the groove form a plurality of concentric zones and wherein wobble cycles in the same zone are spatially coherent.

2. The medium of claim 1, wherein the wobble of the groove is BPSK-modulated for providing address information.

3. The medium of claim 1, wherein the wobble cycles in the same zone subtend the same angle; and wherein the wobble cycles in different zones subtend different angles.

4. The medium of claim 3, wherein average spatial period of a wobble cycle in a zone is an integer multiple of channel bit length.

5. The medium of claim 4, wherein maximum deviation of the wobble spatial period in each zone is the same fixed percentage.

6. The medium of claim 3, wherein wobble cycle period is stepped from zone-to-zone.

7. The medium of claim 6, wherein each zone includes a plurality of tracks.

8. The medium of claim 1, wherein the groove has the same number of wobble cycles as a groove having CLV wobble.

9. The medium of claim 1, wherein wobble cycles in the same zone are completely out-of-phase.

10. The medium of claim 1, wherein wobble cycles on at least two adjacent tracks are spatially coherent.

11. The medium of claim 1, wherein the optical storage medium is a DVD disk.

12. An optical storage medium comprising:
    a recordable medium; and
    a groove in the recordable medium, the groove having a plurality of wobble cycles that form a plurality of concentric zones, wobble cycles in the same zone subtending the same angle, wobble cycles in different zones subtending different angles.

13. The medium of claim 12, wherein the wobble of the groove is BPSK-modulated for providing address information.

14. The medium of claim 12, wherein average spatial period of the wobble cycles in the zones are integer multiples of channel bit length.

15. The medium of claim 12, wherein maximum deviation of wobble spatial period in each zone is the same fixed percentage.

16. The medium of claim 12, wherein wobble cycle period is stepped from zone-to-zone.

17. The medium of claim 16, wherein each zone includes a plurality of tracks.

18. The medium of claim 12, wherein the groove has the same number of wobble cycles as a groove having CLV wobble.

19. The medium of claim 12, wherein the wobble cycles in the same zone are spatially coherent.

20. The medium of claim 12, wherein the wobble cycles in the same zone are completely out-of-phase.

21. The medium of claim 12, wherein wobble cycles on at least two adjacent tracks are spatially coherent.

22. An optical disk comprising:
    a recordable medium; and
    a groove in the recordable medium, the groove having a plurality of wobble cycles that form a plurality of concentric zones, wobble cycles in the same zone subtending the same angle, wobble cycles in different zones subtending different angles, the wobble cycles being BPSK-modulated.

23. The disk of claim 22, wherein the groove has the same number of wobble cycles as a CLV wobble groove.

24. The disk of claim 22, wherein the disk is a DVD disk.

* * * * *